(12) United States Patent
Oba et al.

(10) Patent No.: US 6,250,721 B1
(45) Date of Patent: Jun. 26, 2001

(54) WHEEL BALANCE WEIGHT

(75) Inventors: Kentaro Oba, Tokyo; Saburo Maruyama, Ayase, both of (JP)

(73) Assignee: Topy Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/354,567

(22) Filed: Jul. 16, 1999

(51) Int. Cl.[7] .................................................. B60B 1/00
(52) U.S. Cl. ........................................................ 301/5.21
(58) Field of Search ................................. 301/5.21, 53.5

(56) References Cited

U.S. PATENT DOCUMENTS

| | | | |
|---|---|---|---|
| D. 119,321 | * 3/1940 | Mills | 301/5.21 |
| D. 132,030 | * 4/1942 | Kalajian | 301/5.21 |
| D. 161,006 | * 11/1950 | Dailey | 301/5.21 |
| 2,122,065 | 6/1938 | Hume . | |
| 2,197,364 | * 4/1940 | Hatch | 301/5.21 |
| 2,218,410 | * 10/1940 | Weaver | 301/5.21 |
| 2,248,265 | * 7/1941 | Wright | 301/5.21 |
| 2,258,011 | * 10/1941 | Inman | 301/5.21 |
| 2,469,997 | * 5/1949 | Simpson | 301/5.21 |
| 2,522,039 | * 9/1950 | Jacobsen et al. | 301/5.21 |
| 2,548,842 | * 4/1951 | McCrorey | 301/5.21 |
| 2,576,724 | * 11/1951 | Pouell | 301/5.21 |
| 2,696,408 | * 12/1954 | Merriman | 301/5.21 |
| 3,011,828 | * 12/1961 | Karig | 301/5.21 |
| 3,056,631 | * 10/1962 | Mills | 301/5.21 |
| 3,633,263 | 1/1972 | Hoeksema . | |
| 3,669,500 | * 6/1972 | Ende | 301/5.21 |
| 3,688,380 | 9/1972 | Hofmann et al. . | |
| 3,774,970 | * 11/1973 | Murphy et al. | 301/53.5 |

FOREIGN PATENT DOCUMENTS

3642369 A1    6/1988   (DE) .

* cited by examiner

*Primary Examiner*—S. Joseph Morano
*Assistant Examiner*—Long Bao Nguyen
(74) *Attorney, Agent, or Firm*—Pillsbury Winthrop LLP (57) ABSTRACT

A wheel balance weight is made from ductile cast iron and is formed by casting. The wheel balance weight includes a weight body accurately extending along a flange of a wheel and a clip coupled to the weight body. The weight body includes a groove at a longitudinally central portion of the weight body. The clip is fit into the groove and is fixed to the weight body by caulking the width sides of the groove. The weight body may have a pillar at a bottom surface of the groove and a clip may have an aperture for accommodating the pillar pass through. By caulking a head of the pillar after letting the pillar pass through the aperture of the clip, coupling of the weight body with the clip is strengthened.

6 Claims, 6 Drawing Sheets

WHEEL BALANCE WEIGHT

BACKGROUND OF THE INVENTION

1. Field of the Invention

The present invention relates to a wheel balance weight.

2. Description of Related Art

In an automobile wheel assembly including a wheel and a tire, a dynamic imbalance may exist when the wheel is rotated. Generally, to compensate for this imbalance the wheel is provided with a balance weight.

Figure 14:
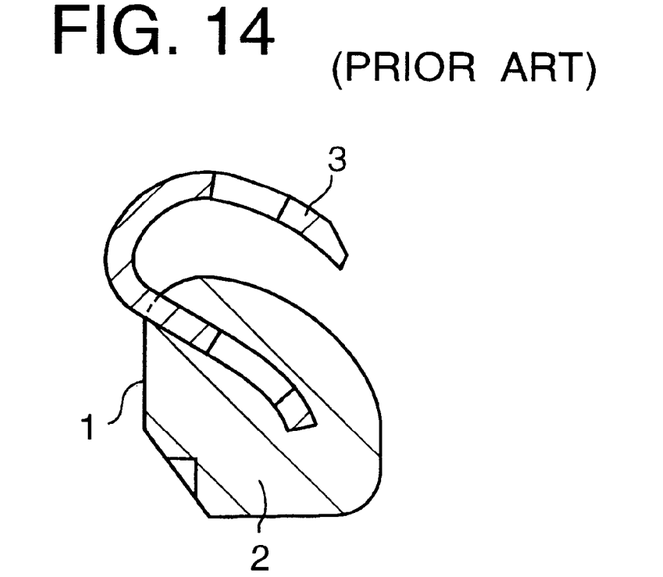
FIG. 14 is a cross-sectional view of a conventional wheel balance weight.
Figure 15:
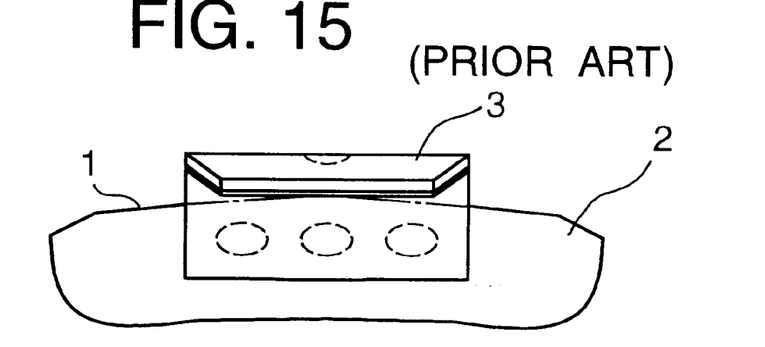
FIG. 15 is a front elevational view of the wheel balance weight of FIG. 14.
Figure 16:
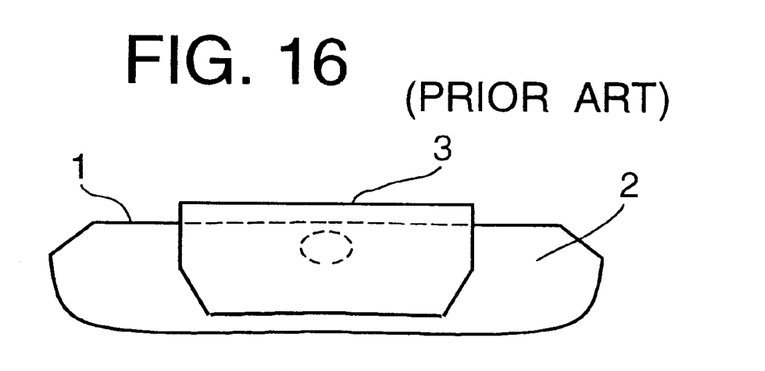
FIG. 16 is a plan view of the wheel balance weight of FIG. 14.

As illustrated in FIGS. 14–16, a conventional balance weight 1 includes a weight body 2 made from lead (Pb) and a clip 3 having an end which is embedded in said weight body. The technical specification of the conventional balance weight is determined by Japanese Automobile Standards Organization (JASO). The manufacturing method and the specification thereof are as follows:

Weight Body: The weight body may be made of lead (Pb). The weight body is manufactured by casting.

Clip: Clip is a hook for mounting the balance weight to a flange of a wheel. The clip may be made of spring steel. The clip is fixed to the weight body by embedding an end portion of the clip in the weight body when the weight body is cast.

Surface Treatment: Surface treatment for prevention of rust and galvanic corrosion is applied to the clip.

Heat Treatment: To obtain an elastic characteristic, a specific heat treatment is applied to the clip before the end of the clip is cast in the weight body. Because the melting point of Pb is low, the elastic characteristic of the clip obtained by the heat treatment is not degraded when the end of the clip is cast in the weight body.

Recently, there has been a trend to avoid the industrial use of heavy metals such as Pb for the purpose of environmental protection. Thus, the Pb of the balance weight is apt to be substituted for other materials.

As an alternative, from an industrial viewpoint, materials such as Fe or Cu can be used. Those materials are inexpensive, environmentally friendly and have a relatively high density.

However, since those materials have a relatively high melting point, the following problems occur with respect to manufacture of the weight body and to coupling of the clip to the weight body:

First, in a case where an end of the clip is cast in the weight body, since the melting points of the clip and the weight body are close to each other, the elastic characteristic of the clip is degraded or deteriorated, and the effect of the casting is weakened. If heat treatment of the clip is conducted after the clip is cast with the weight body, the condition of the heat treatment is severe because heat to the clip will be absorbed by the weight body, and, as a result, the heat treatment will be accompanied by an increase in cost.

Second, in a case where a surface treatment is applied to the clip before the clip is cast with the weight body, the clip is exposed to a high temperature during casing, and the heat-treated surface is degraded. Therefore, various limitations or modifications of the manufacturing will be necessary.

In order to solve these problems, the inventors have investigated manufacturing the weight body by cold forging and coupling the clip to the weight body by caulking.

However, there are the following problems with manufacturing the weight body by cold forging:

First, cold-forging the material to the configuration of the weight body requires a large pressing force and a large-sized press machine which increases the manufacturing cost.

Second, it is difficult to form the material into the configuration of the weight body in one pressing step; a plurality of pressing steps will be necessary. This results in a need for a plurality of sets of pressing dies which also increases the manufacturing cost.

For the above-described reasons, the cost of the balance weight will be high. Solutions for the cost problem are thus desired.

SUMMARY OF THE INVENTION

An object of the present invention is to provide a wheel balance weight which is preferable from the viewpoint of environmental protection.

Another object of the present invention is to provide a wheel balance weight having a weigh body which is easy to form.

Another object of the present invention is to provide a wheel balance weight having a clip whose spring characteristic and surface treatment layer are not deteriorated during coupling of the clip to the weight body.

The above-described objects are performed by a wheel balance weight according to the present invention.

The wheel balance weight according to the present invention includes a weight body and a clip fixed to the weight body.

The weight body is preferably made from ductile cast iron. The weight body includes a longitudinal portion extending in an arc along a flange of a wheel to which the wheel balance weight is to be coupled, a radial portion extending in a radial direction of the arc, and a configuration including a contact surface at which the wheel balance weight contacts the flange of the wheel. The weight body includes a groove at the contact surface at a longitudinally central portion of the weight body. The groove includes a bottom surface receding from the contact surface and a pair of side surfaces extending from the bottom surface to the contact surface at width ends of the bottom surface. The groove includes a radially extending portion which extends in the radical direction of the arc and has a depth equal to or greater than a thickness of the clip. The weight body and the groove are formed by casting.

The clip is provided with elasticity. The clip extends along the bottom surface of the groove of the weight body. The clip is folded at an end of the flange of the wheel so as to hold the flange of the wheel, and clip includes an engaging portion for engagement with the weight body.

The clip is fixed to the weight body by disposing the clip in the groove of the weight body and caulking at least a portion of the pair of side surfaces of the radially extending portion of the groove thereby fixing width end portions of the clip.

The weight body may have an engaging portion at the pair of side surfaces of the radially extending portion of the groove. The weight body engages with the clip at the engaging portion of the weight body in an at least radially inwardly direction of the arc.

The engaging portion of the weight body may include projections projecting from each of the pair of side surfaces toward an opposed side surface.

The weight body may include a pillar at the botton surface of the radially portion of the groove. The pillar extends in a direction away from the bottom surface. The pillar has a head portion. The clip has an aperture for letting the head portion of the pillar pass therethrough. The head portion of the pillar is caulked after the head portion of the pillar is caused to pass through the aperture of the clip when the clip is coupled to the weight body.

The engaging portion of the weight body may include tapered portions formed at the pair of side surfaces of the groove. The tapered portions of the engaging portion of the weight body are tapered such that a distance between the pair of side surfaces of the groove is decreased in a direction extending radially outward in the radial direction of the arc.

The clip may have opposite side surfaces which are tapered such that a distance between the opposite side surfaces is decreased in a direction away from the bottom surface of the groove.

The above-described wheel balance weight is preferable from the standpoint of environmental protection because lead (Ph) is not used. Further, because the weight body is formed by casting, forming is easy as compared with forming by cold forging. Furthermore, because the clip is coupled to the weight body not by casting but by caulking, the spring characteristic and the surface treatment of the clip are not deteriorated by heat.

BRIEF DESCRIPTION OF THE DRAWINGS

The objects, features, and advantages of the present invention will become more apparent and will be more readily appreciated by the following detailed description of the preferred embodiments illustrated by the accompanying drawings, in which.

DETAILED DESCRIPTION OF THE PREFERRED EMBODIMENTS

Portions common to all of the embodiments of the present invention are denoted with like reference numerals throughout all of the embodiments of the present invention.

First, portions common to all of the embodiments of the present invention will be explained with reference to FIGS. 1–3 and FIGS. 11a–13b.

Figure 1:
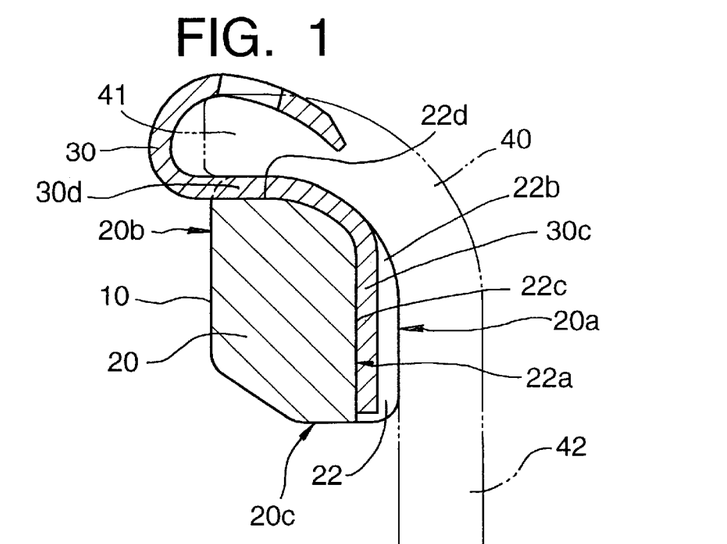
FIG. 1 is a cross-sectional view of a wheel balance weight according to a first embodiment of the present invention.
Figure 2:
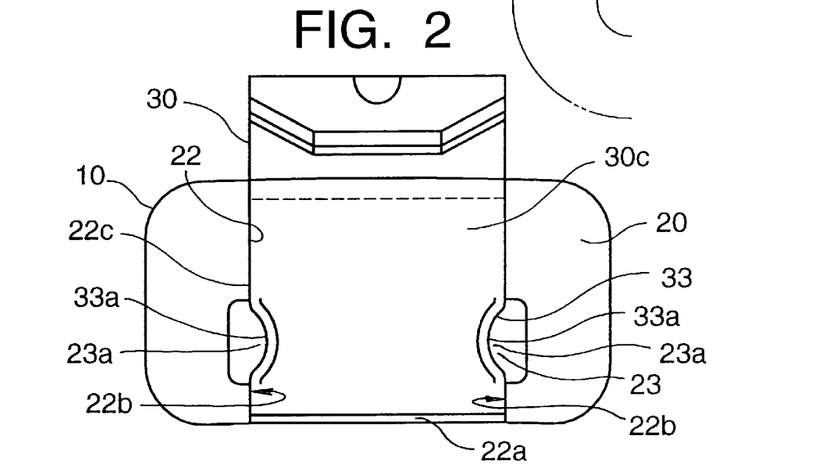
FIG. 2 is a front elevational view of the wheel balance weight of FIG. 1.
Figure 3:
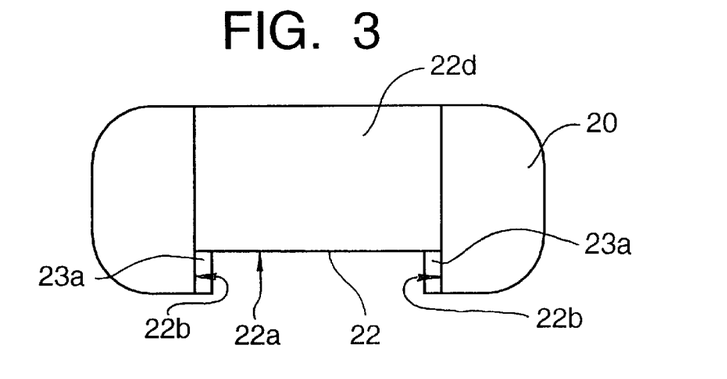
FIG. 3 is a plan view of a weight body of the wheel balance weight of FIG. 1.

A wheel balance weight 10 according to the present invention includes a weight body 20 and a clip 30 fixed to the weight body 20.

The weight body 20 is made from a metal other than lead. Preferably, the weight body 20 is made from ductile cast iron. Ductile cast iron has a relatively high specific density and may be easily formed into a desirable configuration by casting. Ductile cast iron has sufficient ductility and toughness and can be caulked to hold the clip 30.

Ductility of cast iron is generally low. Though high-manganese cast iron has a little more ductility than general cast iron, the high-manganese cast iron is expensive and is difficult to use for the material of the weight body. Ductile cast iron is also called spheroidal graphite cast iron and is produced by adding magnesium to melted pig iron. By adding magnesium, graphite in cast iron is made spheroidal and ductile cast iron having a relatively high ductility is produced.

In tests, it was confirmed that ductile cast iron had enough ductility to be caulked to hold the clip 30. As a result, ductile cast iron is a preferable material for the weight body 20.

The weight body 20 defines a longitudinal direction extending in an arc along an inside surface of a curled portion of a flange 40 of a wheel to which the wheel balance weight 10 is to be attached, a radial direction of the arc, and a configuration including a contact surface 20a at which the wheel balance weight 10 contacts the flange 40 of the wheel. The weight body 2(0 includes a groove 22 at the contact surface 20a and at a longitudinally central portion of the weight body 20. The groove 22 includes a bottom surface 22a receding from the contact surface 20a in a direction away from the flange 40 of the wheel and a pair of side surfaces 22b extending from the bottom surface 22a to the contact surface 20a at width ends of the bottom surface 22a.

The groove 22 includes a radially extending portion 22c which extends in the radial direction of the arc extending along the flange 40 of the wheel and an axially extending portion 22d which extends in an axial direction of the wheel. The radially extending portion 22c has a depth equal to or greater than a thickness of the clip 30 in order to engage with the clip 30 when the weight body 20 is caulked. The axially extending portion 22d extends in an axial direction of the arc and has a depth nearly equal to the thickness of the clip 30. The weight body 20 has a surface 20b which is perpendicular to an axis of the wheel when the balance weight is attached to the wheel and is distanced apart from a radially extending portion 42 of the flange 40 of the wheel, and a surface 20c which is perpendicular to the surface 20b and is distanced apart from the curled portion of the flange 40 of the wheel. A groove does not need to be formed at the surface 20b or the surface 20c of the weight body 20.

The configuration of the weight body 20 and the formation of the groove 22 are formed by casting at a high efficiency and at a low cost.

The clip 30 is provided with elasticity, namely, a spring characteristic. The clip 30 extends so as to contact an axially outboard surface of the radially extending portion 42 of the flange 40 of the wheel, and an inside surface of the curled portion of the flange 40 of the wheel and is folded back at an end portion 41 of the flange 40 to hold the end portion of the flange 40. The clip 30 includes a radially extending portion 30c which extends in the radial direction of the arc extending circumferentially along the flange 40 and an axially extending portion 30d which extends in the axial direction of the wheel 40. The clip extends along the bottom surface 22a of the groove 22 of the weight body 20. The radially extending portion 30c of the clip 30 has an engaging portion 33 where the clip 30 engages with an engaging portion 23 of the groove 22 of the weight body 20.

The clip 30 is fixed to the weight body 20 by disposing the clip 30 in the groove 22 of the weight body 20 and caulking at least a portion of the pair of side surfaces 22b of the radially extending portion 22c of the groove 22, thereby fixing width end portions of the clip 30.

Figure 13A:
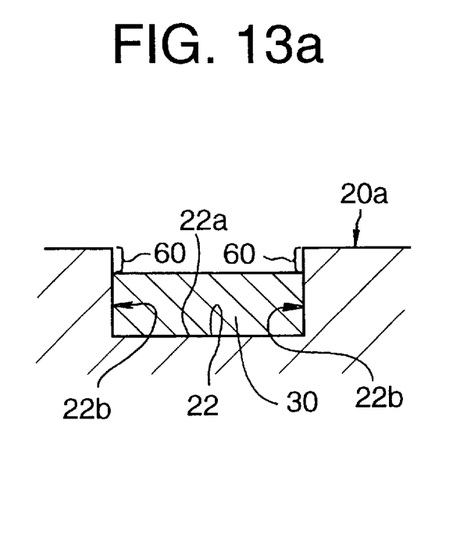
FIG. 13a is a cross-sectional view of another caulking structure before caulking of the wheel balance weight according to any embodiment of the present invention.
Figure 13B:
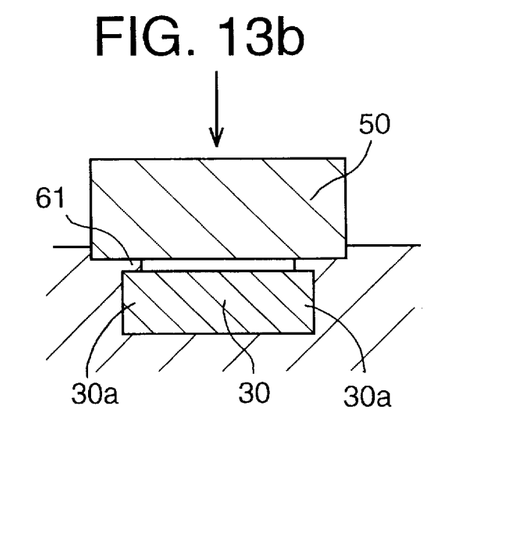
FIG. 13b is a cross-sectional view of another caulking structure after caulking of the wheel balance weight according to any embodiment of the present invention.

More particularly, as illustrated in FIGS. 13a and 13b, a portion 60 of each side surface 22b, from the position distanced apart by the thickness of the clip 30 from the bottom surface 22a of the groove 22 to a surface 20a of the weight body where the weight body 20 contacts the wheel, is caulked by pressing that portion 60 by a punch 50 so that the portion 60 projects over and engages with the width end portion 30a of the clip 30.

However, with the caulking structure illustrated in FIGS. 13a and 13b, the weight body 20 should have a relatively large ductility, and the portion 60 should have a relatively large dimension in order to obtain a relatively large thickness of the caulked portion 61.

Alternative and more preferable caulking structures are illustrated in FIGS. 11a and 11b and FIGS. 12a and 12b.

Figure 11A:
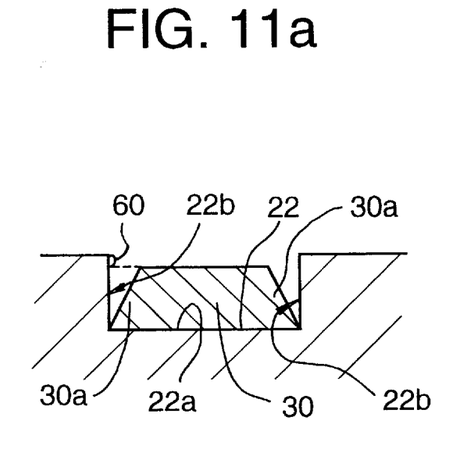
FIG. 11a is a cross-sectional view of a caulking structure before caulking of the wheel balance weight of FIG. 10, which is applicable to any embodiment of the present invention.
Figure 11B:
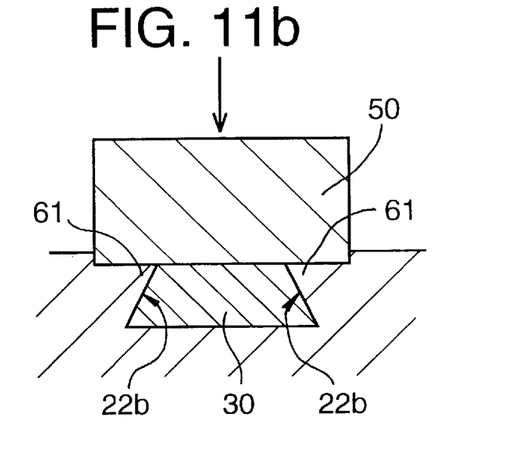
FIG. 11b is a cross-sectional view of a caulking structure after caulking of the wheel balance weight of FIG. 10, which is applicable to any embodiment of the present invention.

In the caulking structure of FIGS. 11a and 11b, before fitting the clip 30 into the groove 22, the opposite width end portions 30a of the clip 30 are tapered or chamfered. The tapering or chamfering may he accomplished by pressing, grinding or machining. The depth of the radially extending portion 22c of the groove 22 is greater than the thickness of the clip 30, but the dimension of the portion 60 is smaller than the dimension of the portion 60 of FIG. 13a. Then, portions of the weight body 20 along the side surfaces 22b of the groove 22 are caulked by pressing.

The caulked material 61 in the caulking structure of FIGS. 11a and 11b is less than that needed in the caulking structure of FIGS. 13a and 13b. As a result, in the caulking structure of FIGS. 11a and 11b, flow of the caulked material is smooth and a relatively high rigidity of the caulked portion is obtained. Further, a press machine having a smaller capacity than that of the press machine used in the caulking structure of FIGS. 13a and 13b can be used. Furthermore, the ductility of the weight body 20 can be less than that needed in the caulking structure of FIGS. 13a and 13b.

Figure 12A:
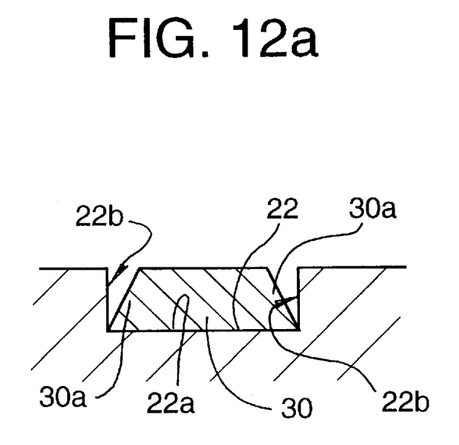
FIG. 12a is a cross-sectional view of another caulking structure before caulking of the wheel balance weight according to any embodiment of the present invention.
Figure 12B:
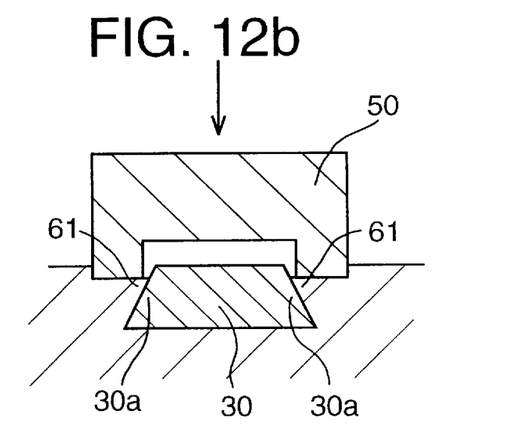
FIG. 12b is a cross-sectional view of another caulking structure after caulking of the wheel balance weight according to any embodiment of the present invention.

In the caulking structure of FIGS. 12a and 12b, before fitting the clip 30 into the groove 22, the opposite width end portions 30a of the clip 30 are tapered or chamfered. The tapering or chamfering may be accomplished by pressing, grinding or machining. The depth of the radially extending portion 22c of the groove 22 is nearly equal to the thickness of the clip 30. Then, portions of the weight body 20 along the side surfaces 22b of the groove 22 are caulked by pressing. The die of the press machine 50 may have concave at a central portion of the die so as not to push the clip 30.

The caulked material 61 in the caulking structure of FIGS. 12a and 12b is less than that needed in the caulking structure of FIGS. 13a and 13b. As a result, in the caulking structure of FIGS. 12a and 12b, flow of the caulked material is smooth and a relatively high rigidity of the caulked portion is obtained. Further, a press machine having a smaller capacity than that of the press machine used in the caulking structure of FIGS. 13a and 13b can be used. Furthermore, the ductility of the weight body 20 can be less than that needed in the caulking structure of FIGS. 13a and 13b. Further, since a vacant space in the groove 22 of the caulking structure of FIGS. 12a and 12b is smaller than that of the caulking structure of FIGS. 11a and 11b, the density of the balance weight of the caulking structure of FIGS. 12a and 12b is greater than that of the caulking structure of FIGS. 11a and 11b. As a result, the longitudinal length of the balance weight of the caulking structure of FIGS. 12a and 12b may be shorter than the longitudinal length of the balance weight of the caulking structure of FIGS. 11a and 11b, and thus may be easier to manufacture and fix to the wheel.

Usually, a surface treatment by electrode position coating is applied to the weight body 20, and a surface treatment by galvanizing electrodeposition coating is applied to the clip 30.

When the balance weight 10 is attached to the wheel, the clip 30 elastically engages with the flange 40 of the wheel.

After being attached to the wheel, the balance weight 10 and the wheel engage each other as follows. With a centrifugal force acting on the weight body 20 when the wheel is rotated, the weight body 20 is supported by the curled portion (end portion) 41 of the flange 40 of the wheel from the outside, because the weight body 20 contacts the inside surface of the curled portion 41. With a radially inward force (gravity) acting on the weight body 20, the weight body 20 is supported by engagement between the engaging portion 33 of the clip 30 and the engaging portion 23 of the groove 22.

With an axial force acting on the weight body 20, since the clip 30 elastically holds the curled portion 41 of the flange 40 and the weight body 20 engages the clip 30 by caulking at the engaging portion 23, the weight body 20 is supported by the flange 40 of the wheel via the clip 30.

In a circumferential direction of the wheel, the weight body 20 and the clip 30 engage each other by means of the groove 22.

Thus, the weight body 20 and the clip 30 are fixed to each other in all directions of the wheel.

Next, portions unique to each embodiment of the present invention will be explained.

With the first embodiment of the present invention, as illustrated in FIGS. 1–3, the weight body 20 has an engaging portion 23 at the pair of side surfaces 22b of the radially extending portion 22c of the groove 22. The weight body 20 engages with the clip 30 at the engaging portion 23 of the weight body 20 in an at least radially inwardly direction of the arc along the flange 40.

The engaging portion 23 of the weight body 20 includes projections 23a projecting from each of the pair of side surfaces 22b toward an opposed side surface. The engaging portion 33 of the clip 30 is formed at a position corresponding to the projection 23a of the weight body 20, and includes a recess 33a for engaging the engaging portion 23. The projection 23a of the weight body 20 and the recess 33a of the clip 30 engage each other.

When the projection 23a of the weight body 20 and the recess 33a of the clip 30 engage each other, the engaging portion 23 of the weight body 20 engages the clip 30 in radially outward and inward directions of the arc along the flange 40 and thus cannot move relative to the clip 30 in the radially outward and inward directions of the arc along the flange 40.

Figure 4:
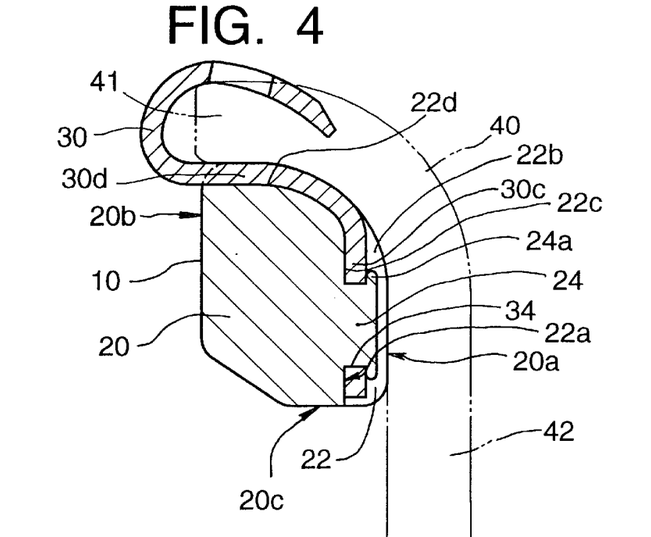
FIG. 4 is a cross-sectional view of a wheel balance weight according to a second embodiment of the present invention.
Figure 5:
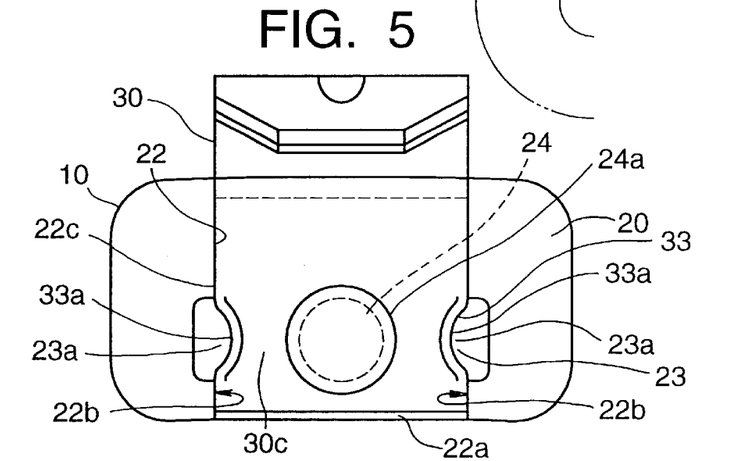
FIG. 5 is a front elevational view of the wheel balance weight of FIG. 4.
Figure 6:
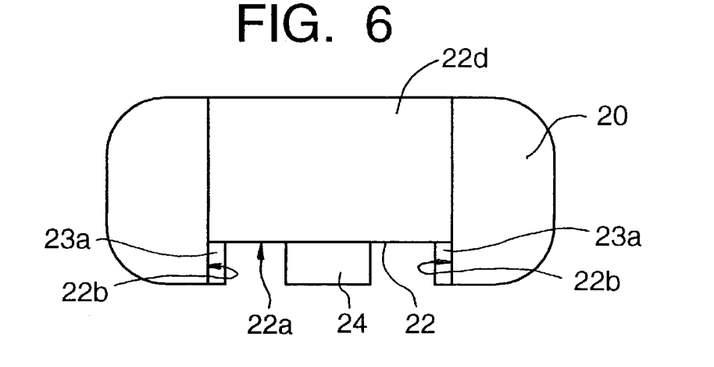
FIG. 6 is a plan view of a weight body of the wheel balance weight of FIG. 4.

With the second embodiment of the present invention, as illustrated in FIGS. 4–6, the weight body 20 has an engaging portion 23 at the pair of side surfaces 22b of the radially extending portion 22c of the groove 22. The weight body 20 engages with the clip 30 at the engaging portion 23 of the weight body 20 in an at least radially inwardly direction of the arc along the flange 40.

The engaging portion 23 of the weight body 20 includes projections 23a projecting from each of the pair of side surfaces 22b toward an opposed side surface. The engaging portion 33 of the clip 30 is formed at a position corresponding to the projection 23a of the weight body 20 and includes a recess 33a for engaging the engaging portion 23. The projection 23a of the weight body 20 and the recess 33a of the clip 30 engage each other.

When the projection 23a of the weight body 20 and the recess 33a of the clip 30 engage each other, the engaging portion 23 of the weight body 20 engages the clip 30 in radially outward and inward directions of the arc along the flange 40.

Further, the weight body 20 includes a pillar 24 at the bottom surface 22a of the radially extending portion 22c of the groove 22. The pillar 24 extends in a direction away from the bottom surface 22a. The pillar 24 has a head portion. The clip 30 has an aperture 34 for letting the head portion of the pillar 24 pass therethrough. The head portion of the pillar 24 is caulked after the head portion of the pillar 24 is caused to pass through the aperture 34 of the clip 30 when the clip 30 is coupled to the weight body 20.

Thus, the weight body cannot move relative to the clip 30 in the radially outward and inward directions of the arc along the flange 40. Further, the clip 30 cannot move out from the pillar 24 in an axial direction of the pillar 24 because the clip 30 engages the caulked head portion 24a of the pillar 24.

Figure 7:
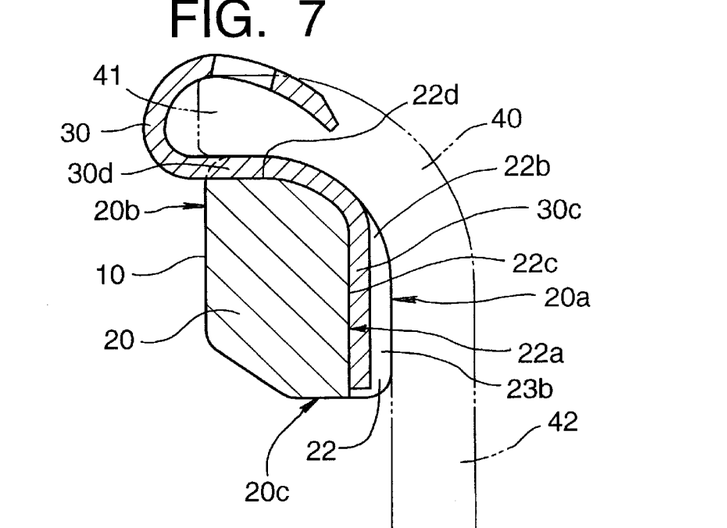
FIG. 7 is a cross-sectional view of a wheel balance weight according to a third embodiment of the present invention.
Figure 8:
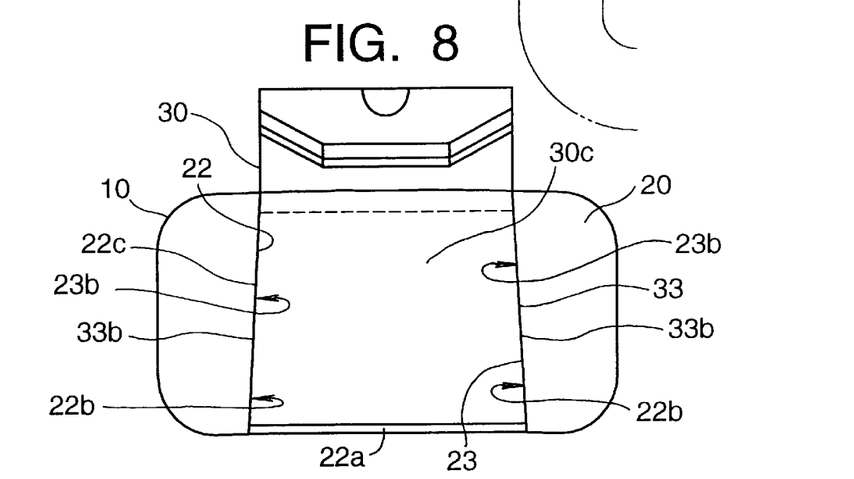
FIG. 8 is a front elevational view of the wheel balance weight of FIG. 7.
Figure 9:
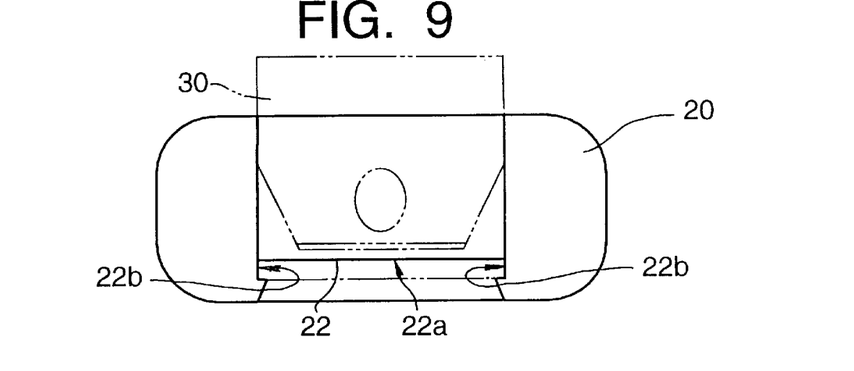
FIG. 9 is a plan view of a weight body of the wheel balance weight of FIG. 7.

With the third embodiment of the present invention, as illustrated in FIGS. 7–9, the weight body 20 has an engaging portion 23 at the pair of side surfaces 22b of the radially extending portion 22c of the groove 22. The weight body 20 engages with the clip 30 at the engaging portion 23 of the weight body 20 in a radially inwardly direction of the arc along the flange 40.

The engaging portion 23 of the weight body 20 includes tapered portions 23b formed at the pair of side surfaces of the groove 22. The tapered portions 23b of the engaging portion 23 of the weight body 20 are tapered such that a distance between the pair of side surfaces 22b of the groove 22 is decreased in a direction toward radially outward in the radial direction of the arc along the flange 40.

The engaging portion 33 of the clip 30 is formed at a position corresponding to the tapered portion 23b of the weight body 20 and includes tapered portions 33b capable of engaging the tapered portion 23b of the weight body 20. The tapered portions 23b of the engaging portion 23 of the weight body 20 and the tapered portion 33b of the clip 30 engage each other. In this engagement, the weight body 20 engages the clip 30 at the engaging portion 23 only in the radially inward direction of the arc and cannot move relative to the clip 30 in the radially inward direction of the arc.

Figure 10:
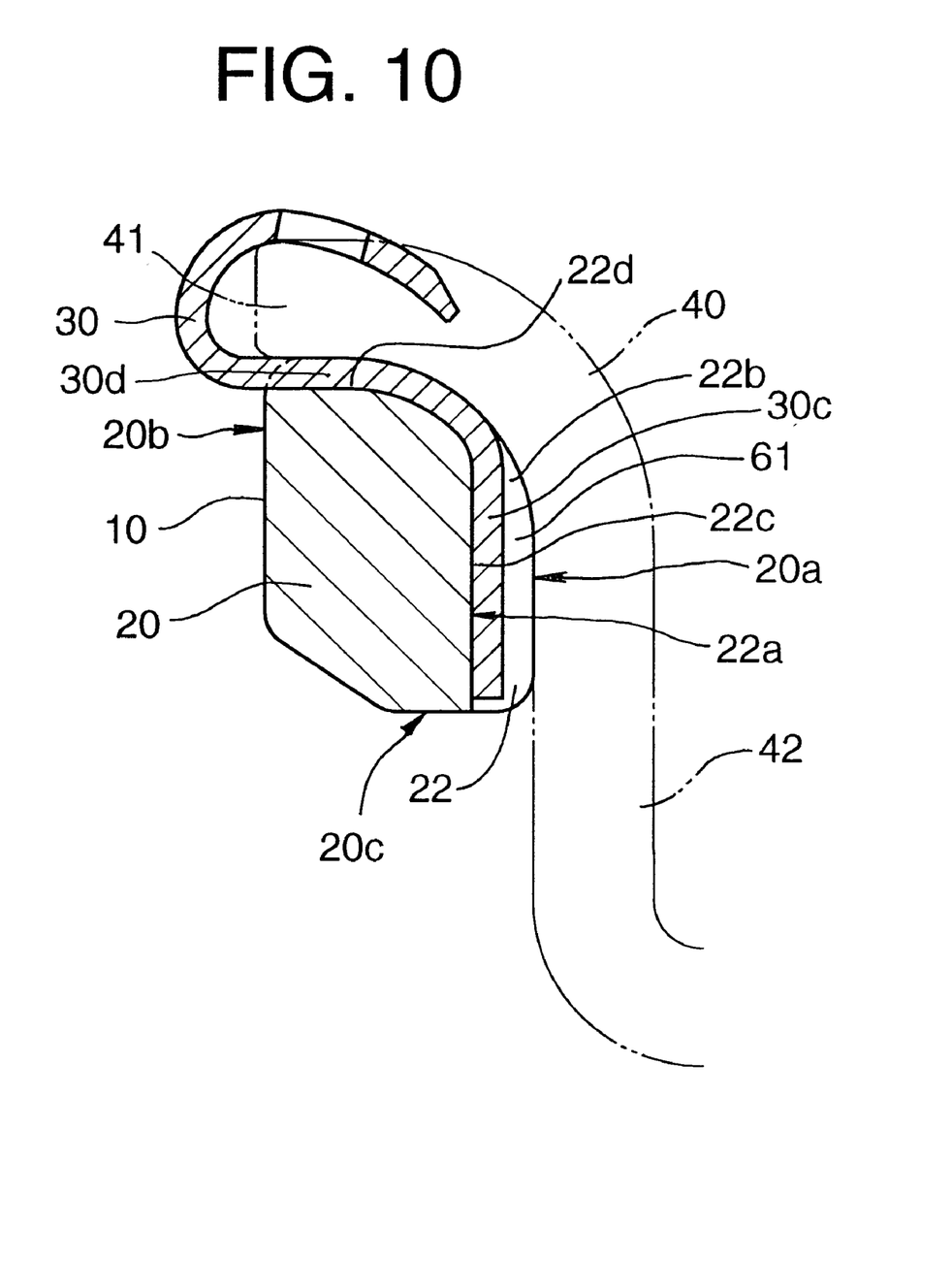
FIG. 10 is a cross-sectional view of a wheel balance weight according to a fourth embodiment of the present invention.

With the fourth embodiment of the present invention, as illustrated in FIGS. 10–11b, the clip 30 has opposite side surfaces which are tapered in a thickness direction such that a distance between the opposite side surfaces is decreased in a direction away from the bottom surface 22a of the groove 22.

Further, the clip 30 has the engaging portion 33. The engaging portion 33 includes the recess 33a (as in FIG. 2) which is formed at each width side of the clip and recedes from the width side toward a width center of the clip 30. When the side surfaces 22b of the groove 22 of the weight body 20 are caulked, the caulked material 61 moves into the recess 33a of the clip 30 and the caulked portion 61 of the weight body 20 and recess 33a of the clip 30 engage each other in the radially outward and inward directions of the arc.

During testing, it was confirmed that when the width sides of the clip 30 were chamfered in the thickness direction thereof, coupling between the weight body 20 and the clip 30 was strengthened, so that only the engaging portion 33 of the clip 30 was as needed to couple the weight body 20 and the clip 30 even though the engaging portion 23 of the weight bodly 20 was not provided.

According to the present invention, the following technical advantages are obtained:

First, since ductile cast iron is used for the material of the weight body environmental concerns associated with a balance weight made from lead are alleviated.

Second, since the weight body is formed by casting, the manufacturing cost is low.

Third, since the clip and the weight body are coupled to each other by caulking, the surface treatment of the weight body and the clip is not deteriorated.

Fourth, since the pair of sides of the groove are caulked, the coupling strength of the weight body with the clip is sufficient.

Fifth, in a case where the weight body has an engaging portion at the pair of side surfaces of the radially extending portion of the groove, and the weight body engages with the clip at the engaging portion of the weight body in an at least radially inwardly direction of the arc, engagement of the weight body with the clip is strong.

Sixth, in a case where the engaging portion of the weight body includes projections projecting from each of the pair of side surfaces toward an opposed side surface, the weight body and the clip engage each other in radially outward and inward directions.

Seventh, in a case where the weight body includes a pillar at the bottom surface of the radially portion of the groove and the clip has an aperture for letting a head portion of the pillar pass therethrough, if the head of the pillar is caulked after the head portion of the pillar is passed through the aperture of the clip, the engagement of the weight body with the clip is further strengthened, especially in an axial direction of the pillar.

Eighth, in a case where the engaging portion of the weight body includes tapered portions formed at the pair of side surfaces of the groove, the weight body is prevented from moving relative to the clip in the radially inward direction of the arc.

Last, in a case where the clip has opposite side surfaces which are tapered or chamfered, a high rigidity of caulking can be obtained, though the amount of caulked material is small.

Although the present invention has been described with reference to specific exemplary embodiments, it will be appreciated in the art that various modifications and alterations can be made to the particular embodiments shown, without materially departing from the novel teachings and advantages of the present invention. Accordingly, it is to be understood that all such modifications and alterations are included within the spirit and scope of the present invention as defined by the following claims.

What is claimed is:

1. A wheel balance weight comprising:

a weight body; and a clip fixed to said weight body, wherein said weight body is made from ductile cast iron, said weight body defines a longitudinal portion extending in an arc along a flange of a wheel to which said wheel balance weight is to be coupled, a radial portion extending in a radial direction of said arc, and a configuration including a contact surface at which said wheel balance weight contacts said flange of said wheel, said weight body including a groove at said contact surface and at a longitudinally central portion of said weight body, said groove including a bottom surface receding from said contact surface and a pair of side surfaces extending from said bottom surface to said contact surface at width ends of said bottom surface, said groove including a radially extending portion which extends in said radial direction of said arc and has a depth equal to or greater than a thickness of said clip, said weight body and said groove being formed by casting, wherein said clip is provided with elasticity, said clip including a radially extending portion extending along said bottom surface of said groove of said weight body, an axially extending portion contacting an inside surface of an end portion of said flange, and a folded portion folded back at the end portion end of said flange of said wheel and extending along an outside surface of the end portion of said flange, said axially extending portion and said folded portion of said clip holding the end portion of said flange of said wheel therebetween, said clip including an engaging portion for engagement with said weight body, and wherein said clip is fixed to said weight body by disposing said clip in said groove of said weight body and caulking at least a portion of said pair of side surfaces of said radially extending portion of said groove, thereby fixing width end portions of said clip.

2. A wheel balance weight according to claim 1, wherein said weight body has an engaging portion at said pair of side surfaces of said radially extending portion of said groove, said weight bodly engaging with said clip at said engaging portion of said weight body in an at least radially inwardly direction of said arc.

3. A wheel balance weight according to claim 2, wherein said engaging portion of said weight body includes projections projecting from each of said pair of side surfaces toward an opposed side surface.

4. A wheel balance weight according to claim 2, wherein said weight body includes a pillar at said bottom surface of said radially extending portion of said groove, said pillar extending in a direction away from said bottom surface, said pillar having a head portion, said clip having an aperture for accommodating said head portion of said pillar, said head portion of said pillar being caulked after said head portion of said pillar is caused to pass through said aperture of said clip when said clip is coupled to said weight body.

5. A wheel balance weight comprising:

a weight body; and a clip fixed to said weight body, wherein said weight body is made from ductile cast iron, said weight body defines a longitudinal portion extending in an arc along a flange of a wheel to which said wheel balance weight is to be coupled, a radial portion extending in a radial direction of said arc, and a configuration including a contact surface at which said wheel balance weight contacts said flange of said wheel, said weight body including a groove at said contact surface and at a longitudinally central portion of said weight body, said groove including a bottom surface receding from said contact surface and a pair of side surfaces extending from said bottom surface to said contact surface at width ends of said bottom surface, said groove including a radially extending portion which extends in said radial direction of said arc and has a depth equal to or greater than a thickness of said clip, said weight body and said groove being formed by casting, wherein said clip is provided with elasticity, said clip extending along said bottom surface of said groove of said weight body, said clip being folded at an end of said flange of said wheel so as to hold said flange of said wheel, said clip including an engaging portion for engagement with said weight body, and wherein said clip is fixed to said weight body by disposing said clip in said groove of said weight body and caulking at least a portion of said pair of side surfaces of said radially extending portion of said groove, thereby fixing width end portions of said clip, wherein said weight body has an engaging portion at said pair of said surfaces of said radially extending portion of said groove, said weight body engaging with said clip at said engaging portion of said weight body in an at least radially inwardly direction of said arc, and wherein said engaging portion of said weight body includes tapered portions formed at said pair of side surfaces of said groove, said tapered portions of said engaging portion of said weight body being tapered such that a distance between said pair of side surfaces of said groove is decreased in a direction extending radially outward in said radial direction of said arc.

6. A wheel balance weight comprising:

a weight body; and a clip fixed to said weight body, wherein said weight body is made from ductile cast iron, said weight body defines a longitudinal portion extending in an arc along a flange of a wheel to which said wheel balance weight is to be coupled, a radial portion extending in a radial direction of said arc, and a configuration including a contact surface at which said wheel balance weight contacts said flange of said wheel, said weight body including a groove at said contact surface and at a longitudinally central portion of said weight body, said groove including a bottom surface receding from said contact surface and a pair of side surfaces extending from said bottom surface to said contact surface at width ends of said bottom surface, said groove including a radially extending portion which extends in said radial direction of said arc and has a depth equal to or greater than a thickness of said clip, said weight body and said groove being formed by casting, wherein said clip is provided with elasticity, said clip extending along said bottom surface of said groove of said weight body, said clip being folded at an end of said flange of said wheel so as to hold said flange of said wheel, said clip including an engaging portion for engagement with said weight body, wherein said clip is fixed to said weight body by disposing said clip in said groove of said weight body and caulking at least a portion of said pair of side surfaces of said radially extending portion of said groove, thereby fixing width end portions of said clip, and wherein said clip has opposite side surfaces which are tapered such that a distance between said opposite side surfaces is decreased in a direction away from said bottom surface of said groove.

* * * * *